US012634403B2

(12) United States Patent
Inomata

(10) Patent No.: US 12,634,403 B2
(45) Date of Patent: May 19, 2026

(54) NON-TRANSITORY COMPUTER READABLE MEDIUM, IMAGE FORMING SYSTEM, AND IMAGE FORMING APPARATUS

(71) Applicant: FUJIFILM Business Innovation Corp., Tokyo (JP)

(72) Inventor: Kohshiro Inomata, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/162,968

(22) Filed: Feb. 1, 2023

(65) Prior Publication Data

US 2024/0073327 A1 Feb. 29, 2024

(30) Foreign Application Priority Data

Aug. 29, 2022 (JP) ................................ 2022-136068

(51) Int. Cl.
*H04N 1/00* (2006.01)
*H04N 1/32* (2006.01)

(52) U.S. Cl.
CPC ..... *H04N 1/00334* (2013.01); *H04N 1/32101* (2013.01); *H04N 1/32523* (2013.01); *H04N 2201/0094* (2013.01)

(58) Field of Classification Search
USPC ....... 358/1.1–3.29, 1.11–1.18; 700/100–102, 700/225–237
See application file for complete search history.

(56) References Cited

U.S. PATENT DOCUMENTS 7,616,337 B2 * 11/2009 Hayashi ................. H04N 1/444 358/1.6
9,009,275 B2 * 4/2015 Fujikawa ........... H04N 1/00464 709/221

(Continued)

FOREIGN PATENT DOCUMENTS

JP 2005-222213 A 8/2005
JP 2007-034443 A 2/2007
JP 2015-000504 A 1/2015

OTHER PUBLICATIONS

Ichikawa Mikiya; Program, Information Processing Device, and Information Processing System; 2016 (Year: 2016).*

(Continued)

*Primary Examiner* — Marcellus J Augustin
(74) *Attorney, Agent, or Firm* — Oliff PLC

(57) ABSTRACT

A non-transitory computer readable medium stores a program causing a computer to execute a process including: transmitting output data to an image forming apparatus; receiving, from the image forming apparatus serving as a destination of the output data, first identification information identifying the output data; photographing a code image identifying the image forming apparatus that performs an output operation; acquiring, from the photographed code image, second identification information identifying the image forming apparatus that performs the output operation; and transmitting, with the first identification information attached to the second identification information, an instruction to perform the output operation to the image forming apparatus that is identified in accordance with the second identification information.

16 Claims, 13 Drawing Sheets

(56) References Cited

U.S. PATENT DOCUMENTS

| | | | | |
|---|---|---|---|---|
| 2004/0010693 | A1 * | 1/2004 | Noguchi | G06F 21/6245<br>713/176 |
| 2006/0290980 | A1 * | 12/2006 | Terada | G06F 3/0233<br>358/1.15 |
| 2011/0058202 | A1 * | 3/2011 | St. Jacques, Jr. | H04N 1/00233<br>358/1.13 |
| 2016/0323355 | A1 * | 11/2016 | Watanabe | H04L 67/025 |
| 2017/0192725 | A1 * | 7/2017 | Choi | G06F 3/1292 |
| 2020/0133592 | A1 * | 4/2020 | Mitsuhashi | G06F 3/1226 |
| 2020/0177743 | A1 * | 6/2020 | Ando | H04N 1/00198 |

OTHER PUBLICATIONS

Yada Shinichi; Image Output Apparatus and Image Output Method; 2006 (Year: 2006).*

* cited by examiner

FIG. 9

| JOB ID | MOBILE TERMINAL ID | PRINT DATA |
|---|---|---|
| abcd011 | 1234567 | PRINT DATA A |
| abcd012 | 111222 | PRINT DATA B |
| abcd013 | 111222 | PRINT DATA C |
| abcd014 | 333444 | PRINT DATA D |
| ..... | ..... | ..... |

NON-TRANSITORY COMPUTER READABLE MEDIUM, IMAGE FORMING SYSTEM, AND IMAGE FORMING APPARATUS

CROSS-REFERENCE TO RELATED APPLICATIONS

This application is based on and claims priority under 35 USC 119 from Japanese Patent Application No. 2022-136068 filed Aug. 29, 2022.

BACKGROUND

(i) Technical Field

The present disclosure relates to a non-transitory computer readable medium, an image forming system, and an image forming apparatus.

(ii) Related Art

Japanese Unexamined Patent Application Publication No. 2015-000504 discloses a printer terminal that sets user information for a user of the printer terminal, accumulates the user information and image data in an associated form, and prints the associated image data by entering user-related information onto the printer terminal.

Japanese Unexamined Patent Application Publication No. 2005-222213 discloses a printer system that performs a simple method of giving a print instruction from a mobile terminal or the like, namely, provides the print instruction to a printer without manually inputting an address of the printer by encoding address information of the printer and photographing the encoded address information.

Japanese Unexamined Patent Application Publication No. 2007-034443 discloses an image forming system. The image forming system displays, on a display, two-dimensional code into which an image forming apparatus encodes address information. When a user photographs the displayed two-dimensional code with a photographing unit of a mobile terminal, the photographed two-dimensional code is converted into the address information. The mobile terminal accesses the address and then transmits a job.

SUMMARY

Aspects of non-limiting embodiments of the present disclosure relate to a non-transitory computer readable medium, an image forming system, and an image forming apparatus outputting an image with a user at a location where the user is able to receive output results from an image forming apparatus, without the user being involved in entering information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a non-transitory computer readable medium storing a program causing a computer to execute a process, the process including: transmitting output data to an image forming apparatus; receiving, from the image forming apparatus serving as a destination of the output data, first identification information identifying the output data; photographing a code image identifying the image forming apparatus that performs an output operation; acquiring, from the photographed code image, second identification information identifying the image forming apparatus that performs the output operation; and transmitting, with the first identification information attached to the second identification information, an instruction to perform the output operation to the image forming apparatus that is identified in accordance with the second identification information.

BRIEF DESCRIPTION OF THE DRAWINGS

Exemplary embodiment of the present disclosure will be described in detail based on the following figures, wherein:

FIG. 9 illustrates an example of a print management table that is stored on a data memory in the image forming apparatus;

DETAILED DESCRIPTION

Exemplary embodiment of the disclosure is described in detail with reference to the drawings.

Figure 1:
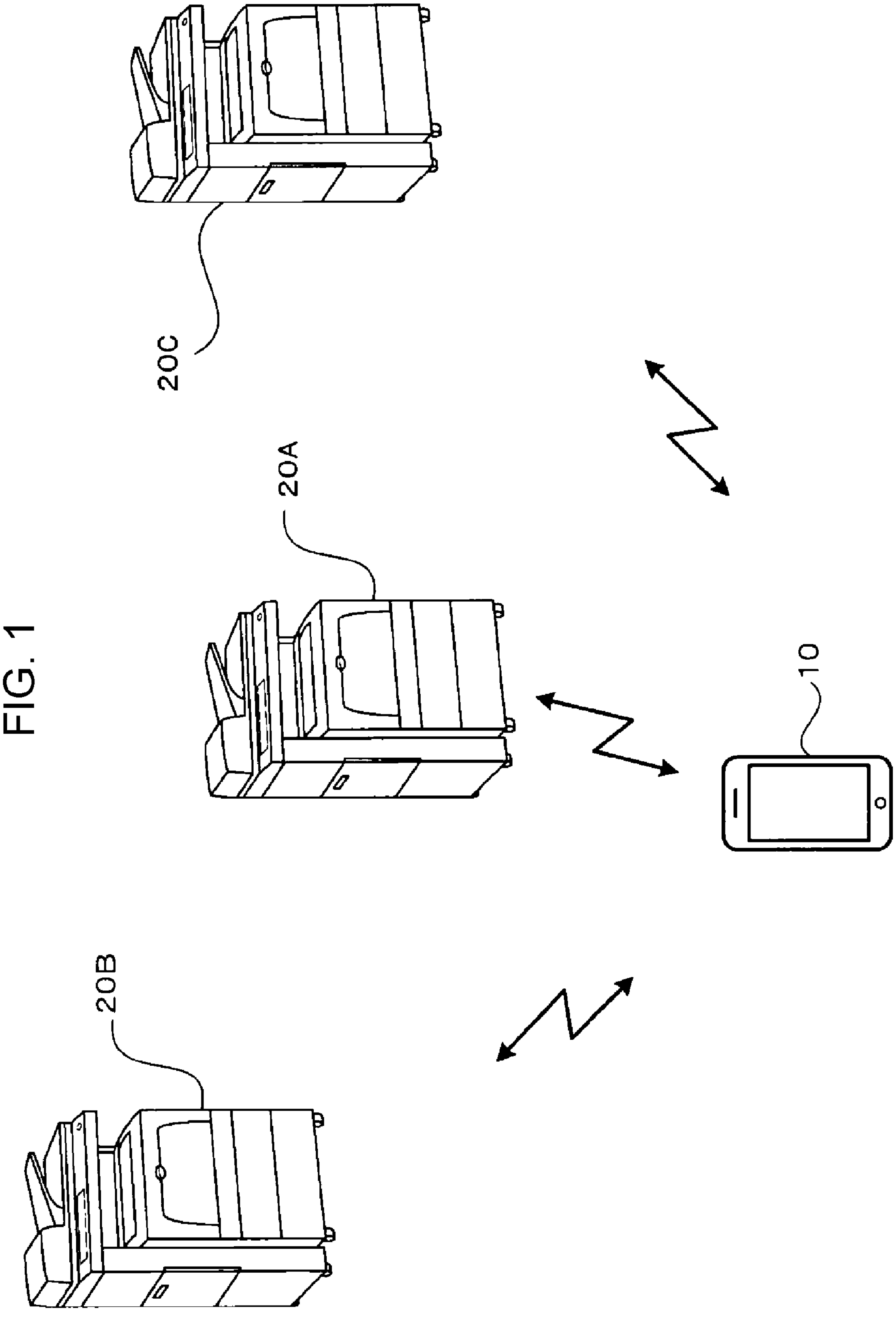
FIG. 1 illustrates a system configuration of an image forming system of an exemplary embodiment of the disclosure.

FIG. 1 illustrates a system configuration of an image forming system of the exemplary embodiment of the disclosure.

The image forming system of the exemplary embodiment of the disclosure includes a mobile terminal apparatus 10 and multiple image forming apparatuses 20A through 20C, mutually interconnected via short-range wireless communication, such as Wi-Fi (registered trademark) direct, Bluetooth (registered trademark), or the like. The mobile terminal apparatus 10 may be a cell phone, such as a tablet terminal apparatus or smart phone. Referring to FIG. 1, for convenience of explanation, a single mobile terminal apparatus 10 is illustrated. In practice, however, multiple mobile terminal apparatuses 10 are connectable to each of the image forming apparatuses 20A through 20C. Referring to FIG. 1, only three image forming apparatuses 20A through 20C are illustrated. The disclosure may be applicable to a configuration where four or more image forming apparatuses are employed. In the following discussion, each of the image forming apparatuses 20A through 20C is referred to as an image forming apparatus 20 if they are not differentiated from each other.

The mobile terminal apparatus 10 is connected to each of the image forming apparatuses 20A through 20C via the short-range wireless communication and is configured to transmit output data, such as print data. If service set identifiers (SSIDs) of the image forming apparatuses 20A through 20C and passwords are registered on the mobile terminal apparatus 10, a user may select, on the mobile terminal apparatus 10, the image forming apparatus to be connected.

The image forming apparatuses 20A through 20C receive the print data from the mobile terminal apparatus 10 and outputs an image responsive to the received print data onto a paper sheet. The image forming apparatuses 20A through 20C are multi-function apparatuses that have multiple functions including a print function, scan function, copy function, and fax function.

When the output data is transmitted to the image forming apparatus, accumulation printing may be performed to control the occurrence in which output results are taken by mistake by someone else other than a regular user. In a print method referred to as the accumulation printing, the output data transmitted to the image forming apparatus is accumulated first and an output operation is performed in response to reception of an output instruction from the user.

A mobile terminal apparatus, such as a tablet terminal or a cell phone, may perform the accumulation printing by transmitting the output data to the image forming apparatus. If the output instruction of the accumulated output data is transmitted via the short-range wireless communication, the output operation may be performed in the state in which the user is not present at a location where the user is able to receive the output results from the image forming apparatus.

The output operation is to be performed in the state in which the user is present at the location where the user is able to receive the output results from the image forming apparatus. To this end, the user may be requested to perform a user operation on the operation panel of the image forming apparatus, for example, may be requested to manually enter information identifying the output data. This may inconvenience the user since the user may be obliged to enter information identifying the output data on the operation of the image forming apparatus.

In the image forming system of the exemplary embodiment, the user may be free from entering information and an image may be output in the state in which the user is present at the location where the user is able to receive the output results from the image forming apparatus.

Figure 2:
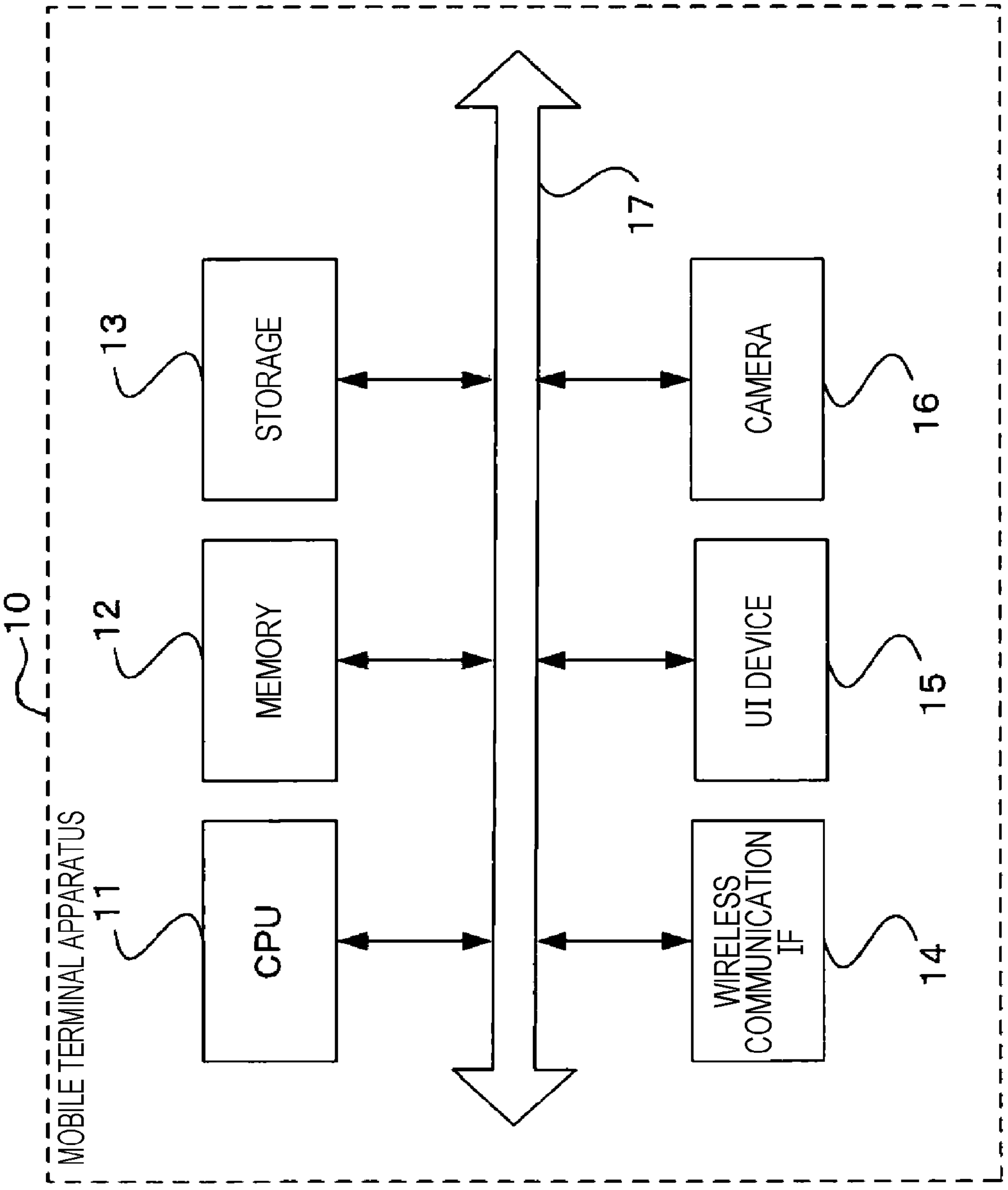
FIG. 2 is a block diagram illustrating a hardware configuration of a mobile terminal apparatus of the exemplary embodiment of the disclosure.

FIG. 2 illustrates a hardware configuration of the mobile terminal apparatus 10 in the image forming system of the exemplary embodiment.

Referring to FIG. 2, the mobile terminal apparatus 10 includes a central processing unit (CPU) 11, memory 12, storage 13, such as a flash memory, wireless communication interface (IF) 14, user interface (UI) device 15 including a touch panel or a liquid-crystal display, and camera 16. These elements are interconnected to each other via a control bus 17.

The CPU 11 performs a predetermined process and controls the operation of the mobile terminal apparatus 10 in accordance with a control program stored on the memory 12 or the storage 13. According to the exemplary embodiment, the CPU 11 reads and executes the control program from the memory 12 or the storage 13. The control program may be delivered in a recorded form on a computer readable recording medium. For example, the control program may be delivered in a recorded form on an optical disk, such as compact disc read-only memory (CD-ROM) or digital versatile disc read-only memory (DVD-ROM), or a semiconductor memory, such as a universal serial bus (USB) memory or a memory card. The control program may be acquired as an application program from an external apparatus via the wireless communication IF 14.

Figure 3:
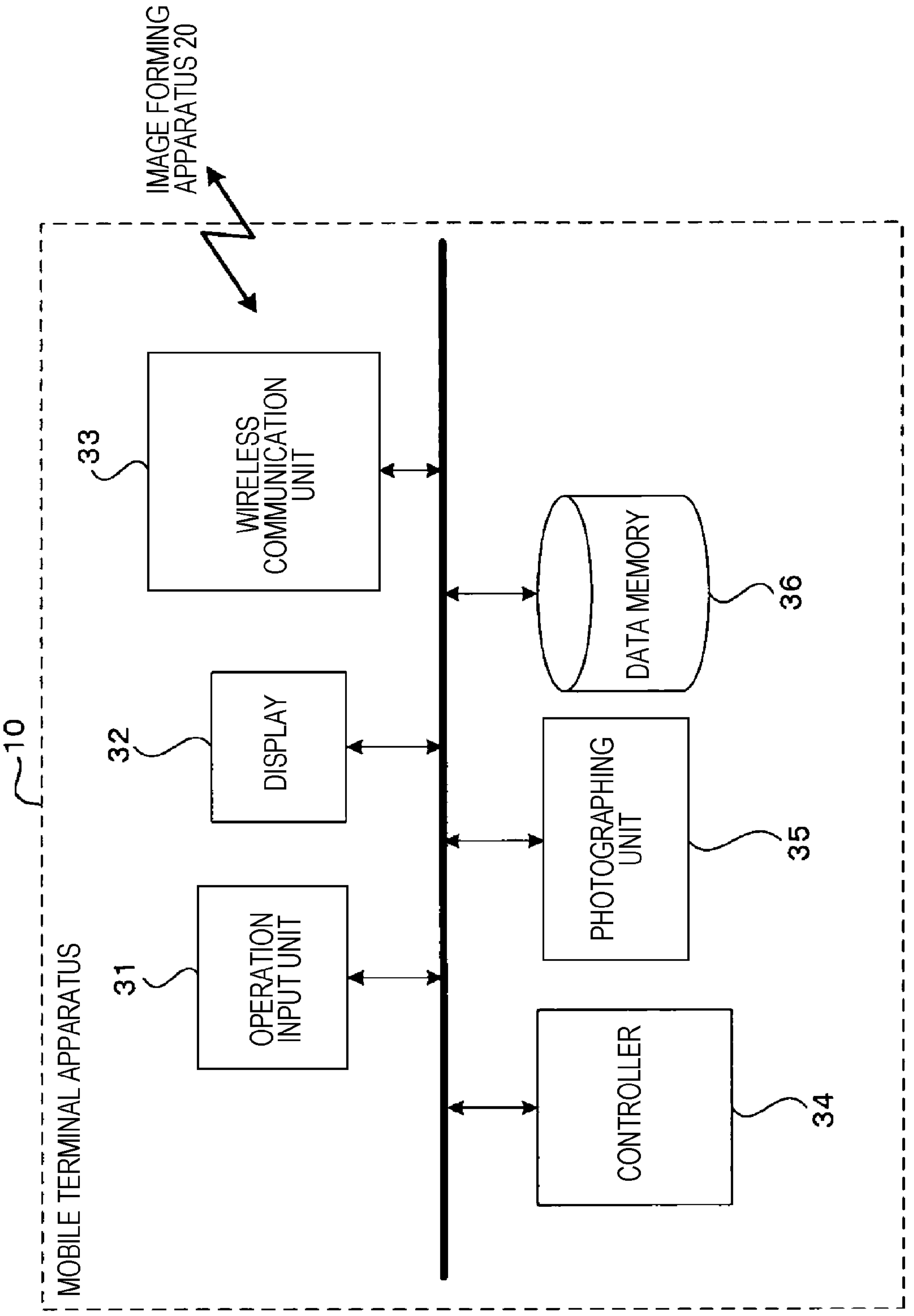
FIG. 3 is a block diagram illustrating a functional configuration of the mobile terminal apparatus of the exemplary embodiment of the disclosure.

FIG. 3 is a block diagram illustrating a functional configuration of the mobile terminal apparatus 10 implemented when the control program is executed.

Referring to FIG. 3, the mobile terminal apparatus 10 of the exemplary embodiment includes an operation input unit 31, display 32, wireless communication unit 33, controller 34, photographing unit 35, and data memory 36.

The display 32 is controlled by the controller 34 and displays a variety of information to a user. The operation input unit 31 enters a variety of information on user operations performed by the user. The controller 34 controls the operation of the mobile terminal apparatus 10 in accordance with the user operation input by the operation input unit 31. The data memory 36 stores a variety of data used when the operation of the mobile terminal apparatus 10 is controlled.

The wireless communication unit 33 is controlled by the controller 34 and exchanges data with the image forming apparatus 20 via the short-range wireless communication, such as Wi-Fi or Bluetooth.

To perform a print operation on the image forming apparatus 20A, the controller 34 transmits to the image forming apparatus 20A a print job instructing the image forming apparatus 20A to print given print data and receives a job ID as identification information identifying the print job from the image forming apparatus 20A serving as a destination of the print data.

The controller 34 photographs a code image identifying the image forming apparatus that performs the print operation. For example, the code image is a two-dimensional image, such as a QR code (registered trademark), into which information, such as uniform resource locator (URL) identifying the image forming apparatus, is encoded. The two-dimensional code is displayed on each of the image forming apparatuses 20A and 20B.

The controller 34 acquires, from the photographed two-dimensional code image, identification information, such as URL, identifying the image forming apparatus 20 that performs the print operation. Specifically, the controller 34 acquires as the identification information the information including the URL identifying the image forming apparatus 20 by decoding the photographed two-dimensional image.

The controller 34 attaches to the identification information, such as the acquired URL, a job ID of a print job to be printed, and then transmits a print instruction to execute the print operation to the image forming apparatus 20 that is identified by the information, such as the URL. Once the URL information is acquired, the controller 34 is free from the operation of the user after the acquisition, and transmits the print instruction to perform the print operation to the image forming apparatus 20 by attaching the job ID to the identification information, such as the URL.

When the print data is transmitted to the image forming apparatus 20, the controller 34 may transmit to the image forming apparatus 20 the print data together with a mobile terminal ID serving as the identification information identifying the mobile terminal apparatus 10 that transmits the print data.

The mobile terminal ID is different from one mobile terminal apparatus 10 to another the mobile terminal apparatus 10 and may be a variety of information including, for example, medium access control address (MAC), serial number of the mobile terminal apparatus 10, password information or other pieces of information.

When the print instruction to perform the print operation is transmitted to the image forming apparatus 20 identified by the URL information, the controller 34 attaches not only the job ID but also the mobile terminal ID to the URL information before sending these pieces of information.

When a single mobile terminal apparatus 10 transmits multiple print jobs to the image forming apparatus 20, the controller 34 causes the user to select a job ID corresponding to the print data used to perform the print job from multiple job IDs corresponding to the print jobs.

When the print instruction to perform the print operation is transmitted to the image forming apparatus 20 identified by the URL information, the controller 34 attaches the selected job ID to the URL information.

Figure 4:
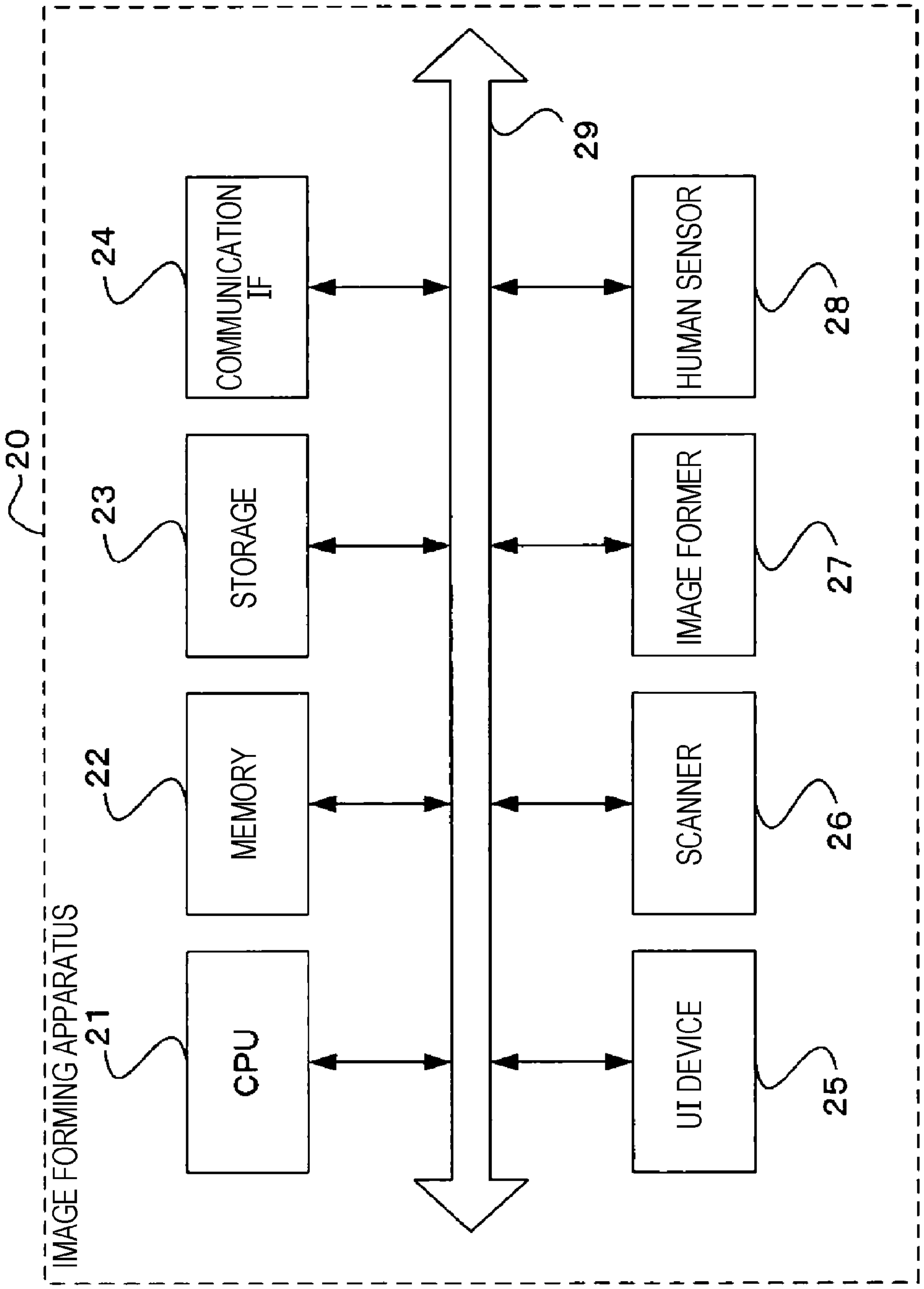
FIG. 4 is a block diagram illustrating a hardware configuration of an image forming apparatus of the exemplary embodiment of the disclosure.

FIG. 4 illustrates a hardware configuration of the image forming apparatus 20 in the image forming system of the exemplary embodiment.

Referring to FIG. 4, the image forming apparatus 20 includes a CPU 21, memory 22, storage 23, such as a hard disk drive, communication interface (IF) 24 that transmits data to or receives data from an external apparatus via a network or a short-range wireless communication, user interface (UI) device 25 including a touch panel or a liquid-crystal display and a keyboard, scanner 26, image former 27, and human sensor 28. These elements are interconnected to each other via a control bus 29.

Using infrared light, the human sensor 28 detects a user present around the image forming apparatus 20.

The CPU 21 controls the operation of the image forming apparatus 20 by performing a predetermined process in accordance with a control program stored on the memory 22 or the storage 23. According to the exemplary embodiment, the CPU 21 reads and executes the control program from the memory 22 or the storage 23. The disclosure is not limited to this method. The control program may be delivered in a recorded form on a computer readable recording medium. For example, the control program may be delivered in a recorded form on an optical disk, such as compact disc read-only memory (CD-ROM) or digital versatile disc read-only memory (DVD-ROM), or a semiconductor memory, such as a universal serial bus (USB) memory or a memory card. The control program may be acquired as an application program from an external apparatus via a communication network connected to the communication IF 24.

Figure 5:
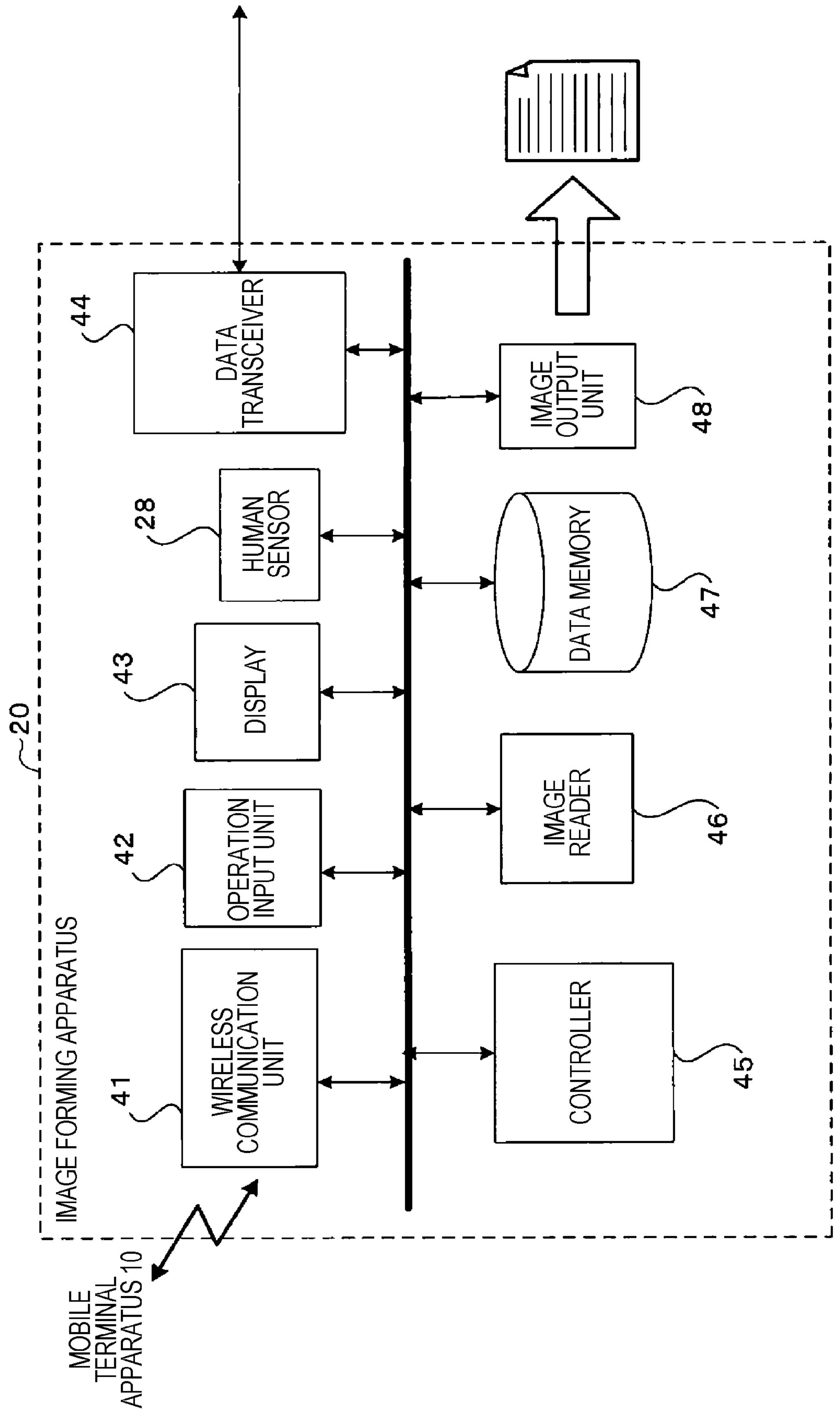
FIG. 5 is a block diagram illustrating a functional configuration of the image forming apparatus of the exemplary embodiment of the disclosure.

FIG. 5 is a block diagram illustrating a functional configuration of the image forming apparatus 20 implemented when the control program is executed.

Referring to FIG. 5, the image forming apparatus 20 of the exemplary embodiment includes a wireless communication unit 41, operation input unit 42, display 43, data transceiver 44, controller 45, image reader 46, data memory 47, and image output unit 48.

The display 43 is controlled by the controller 45 and displays a variety of information to the user. The operation input unit 42 enters a variety of operation information on operations performed by the user. The controller 45 controls the operation of the image forming apparatus 20 in response to the user operation input by the operation input unit 42.

The wireless communication unit 41 is controlled by the controller 45 and exchange data with the mobile terminal apparatus 10 via the short-range wireless communication, such as Wi-Fi or Bluetooth. The data transceiver 44 exchanges data with an eternal apparatus via a network.

The controller 45 performs control to output from the image output unit 48 an image that is based on the print data received as the print job via the wireless communication unit 41 or via the data transceiver 44. The data memory 47 stores a variety of data, such as the received print data.

The image output unit 48 is controlled by the controller 45 and thus outputs the image onto a recording medium, such as a print paper sheet. The image reader 46 is controlled by the controller 45 and reads a document image from a placed document.

In response to reception of the print data from the mobile terminal apparatus 10, the controller 45 generates the job ID as the identification information identifying the received print data and then transmits the job ID to the mobile terminal apparatus 10. The controller 45 stores the received print data and the job ID in an associated form on the data memory 47.

The controller 45 displays, for example, on a home screen of the operation panel, the two-dimensional code image into which the URL information identifying the image forming apparatus 20 is encoded. The two-dimensional code image may not be displayed on the operation panel but displayed on a part of the housing of the image forming apparatus 20. Alternatively, a paper sheet having the two-dimensional code image printed thereon may be glued on the image forming apparatus 20.

Figure 6:
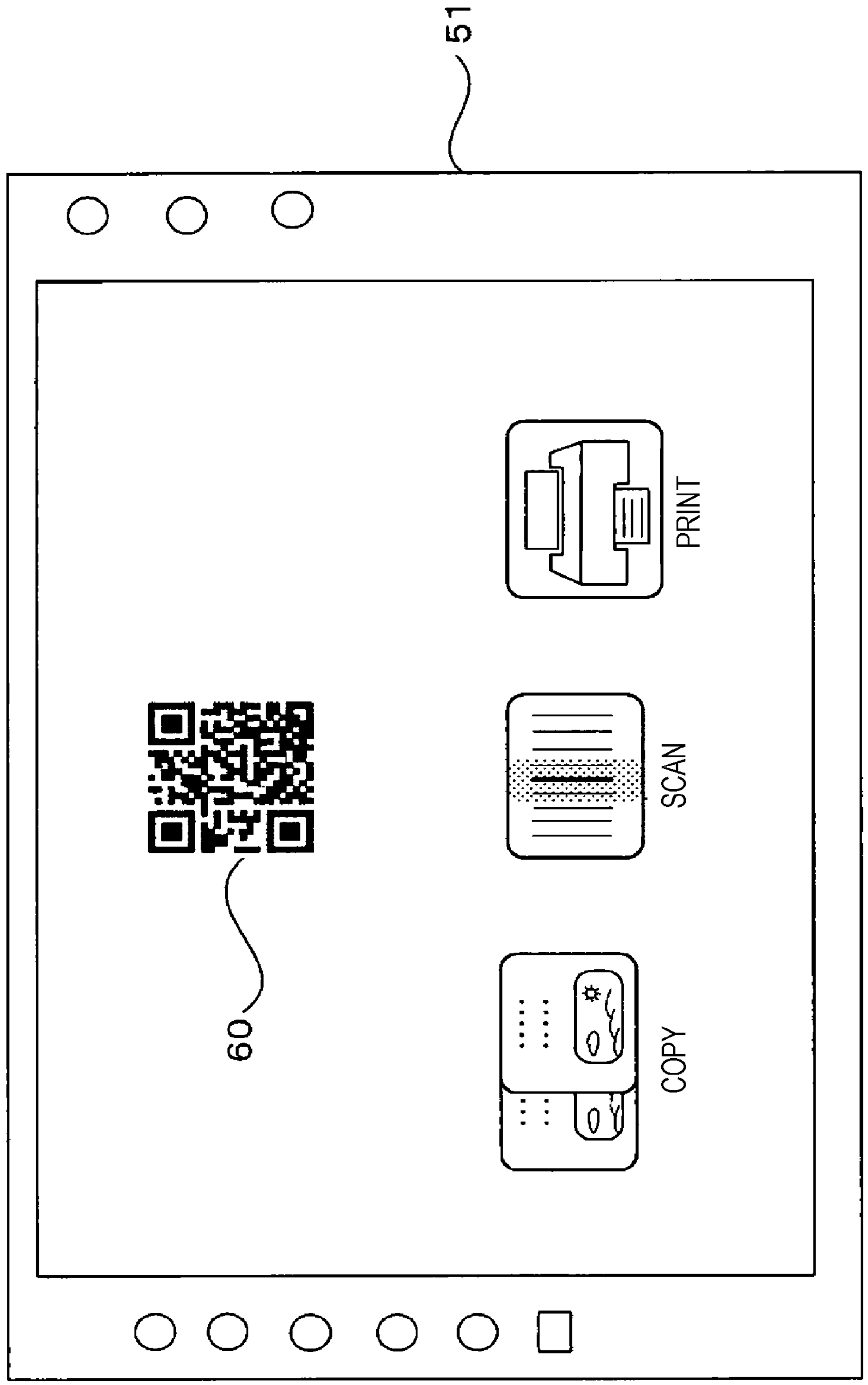
FIG. 6 illustrates an example of a two-dimensional code image that is displayed on an operation panel of the image forming apparatus.

FIG. 6 illustrates an example of the two-dimensional code image that is displayed on the operation panel of the image forming apparatus 20. Referring to FIG. 6, a two-dimensional code image 60 is displayed on the operation panel 51.

When the URL information with the job ID attached thereto is received from the mobile terminal apparatus 10, the URL information may be information identifying the image forming apparatus 20 and the print data corresponding to the job ID may be stored on the data memory 47. In such a case, the controller 45 thus performs the output operation of the output data.

If the mobile terminal apparatus 10 transmits, to the image forming apparatus 20, the print data together with the mobile terminal ID identifying the mobile terminal apparatus 10 having transmitted the print data, the controller 45 stores, in an associated form, the print data, job ID and mobile terminal ID received from the mobile terminal apparatus 10 on the data memory 47.

When the URL information with the job ID and the mobile terminal ID attached thereto is received from the mobile terminal apparatus 10, the URL information may be information identifying the image forming apparatus 20 and the print data corresponding to the job ID and the mobile terminal ID may be stored on the data memory 47. In such a case, the controller 45 performs the output operation of the print data.

In order to display the two-dimensional code image 60 on the operation panel 51 and receive the print instruction from the mobile terminal apparatus 10, the image forming apparatus 20 of the exemplary embodiment is configured to allow the two-dimensional code image 60 to be photographed. Specifically, in order to provide the instruction to perform the print operation on the image forming apparatus 20, the user is obliged to move to the vicinity of the image forming apparatus 20 and photograph the two-dimensional code image 60 displayed on the operation panel 51 with the photographing unit 35 of the mobile terminal apparatus 10.

However, if the two-dimensional code image 60 remains unchanged, an unscrupulous user may photograph the two-dimensional code image 60 and provide an instruction to perform the print operation at a location remote from the image forming apparatus 20.

In view of this event, the controller 45 may vary the two-dimensional code image 60 displayed on the operation panel 51 if a predetermined set condition is satisfied. If the URL information corresponds to the code image currently being displayed with the URL information with the job ID attached thereto being received from the mobile terminal apparatus 10, the controller 45 may perform the print operation of the print job.

The controller 45 may vary the two-dimensional code image 60 each time the human sensor 28 detects approaching of the user. Moreover, the data transceiver 44 varies the two-dimensional code image 60 displayed on the operation panel 51 each time the print operation is performed on a single piece of the print data. Alternatively, the controller 45 may vary the two-dimensional code image 60 displayed on the operation panel 51 each time a predetermined period of time has elapsed, for example, once every hour or once every day. Alternatively, the controller 45 vary the two-dimensional code image 60 displayed on the operation panel 51 each time the image forming apparatus 20 reverts back to a normal operation mode from a power saving mode.

The two-dimensional code image 60 displayed on the operation panel 51 is varied in this way. When the print instruction is received from the mobile terminal apparatus 10, the controller 45 performs the print operation only when the URL information included in the print instruction matches the URL information included in the two-dimensional code image 60 currently being displayed. Specifically, the controller 45 performs the output operation of the print data only when the URL information identifies the image forming apparatus 20 and corresponds to the two-dimensional code image 60 currently being displayed and the print data corresponding to the job ID is stored on the data memory 47.

When the process described above is specifically implemented, an argument is added to URL of the code information when the two-dimensional code image 60 is created. The two-dimensional code image 60 may be varied by varying the argument. For example, the controller 45 may add "https://xxx.yyy/zzz/?codeID=202208260003" as URL of code information in the form of a code ID argument, thereby varying and then may vary the two-dimensional code image 60 by varying the code ID argument.

The mobile terminal apparatus 10 adds, to the URL information resulting from decoding the two-dimensional code image 60, the job ID and the mobile terminal ID and then transmits the resulting URL information. For example, the mobile terminal apparatus 10 adds, to the URL information resulting from decoding the two-dimensional code image 60, information "&ID=abcd011&p=1234567" and transmits the resulting URL information.

The operation of the image forming system of the exemplary embodiment is described in detail below with reference to the drawings.

Figure 7:
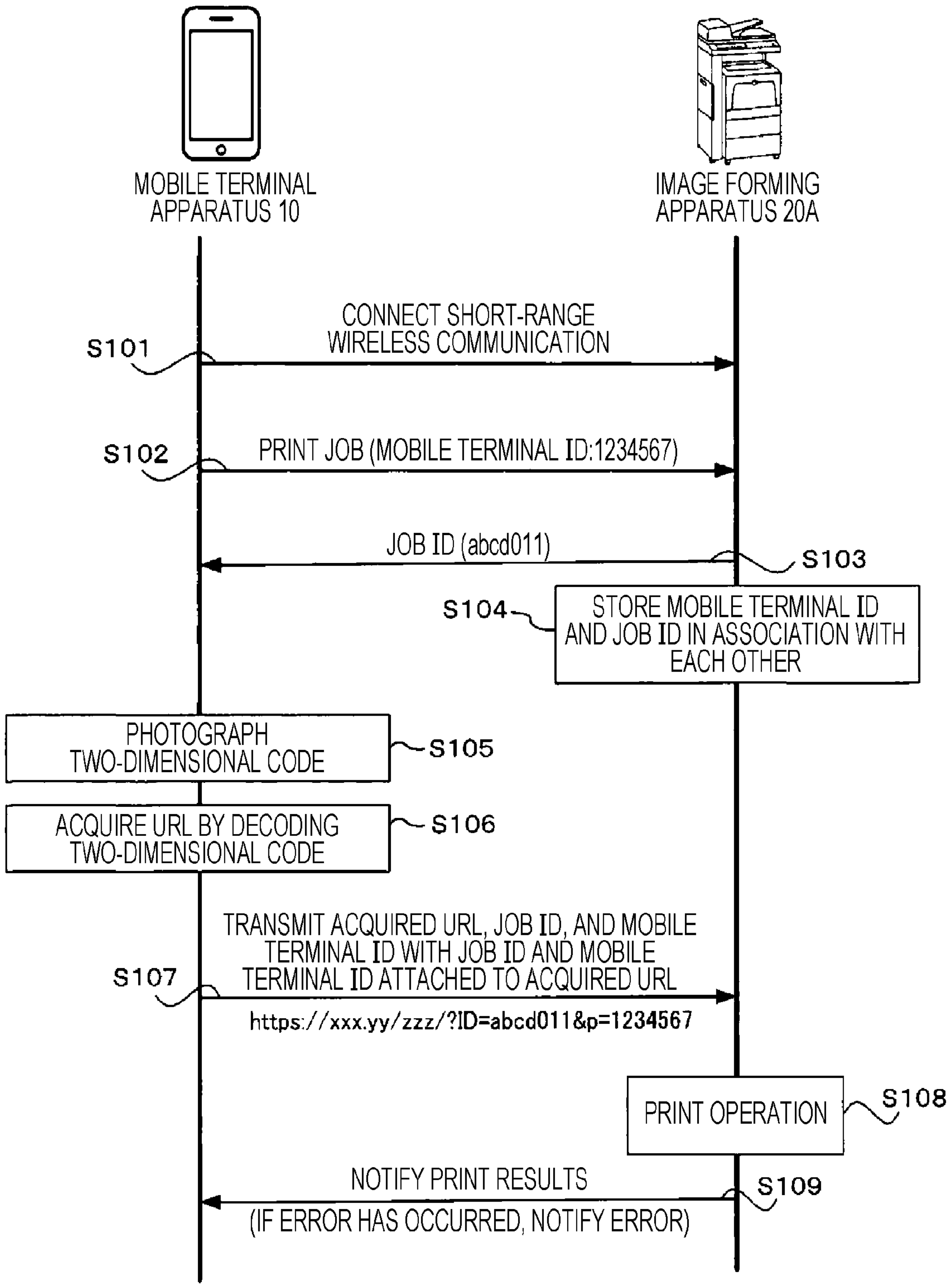
FIG. 7 illustrates a sequence chart illustrating a print operation that the mobile terminal apparatus causes the image forming apparatus to perform.

FIG. 7 is a sequence chart of a print operation that the mobile terminal apparatus 10 causes the image forming apparatus 20A to perform as described below.

In step S101, the mobile terminal apparatus 10 is connected in advance via the short-range wireless communication to the image forming apparatus 20A that preforms the print operation.

In step S102, the mobile terminal apparatus 10 transmits to the image forming apparatus 20A the print job to perform the print operation together with the mobile terminal ID of the mobile terminal apparatus 10, for example, mobile terminal ID "1234567."

In step S103, the image forming apparatus 20A issues the job ID uniquely identifying the received print job and transmits the job ID, for example, "abcd011" to the mobile terminal apparatus 10.

Figure 8:
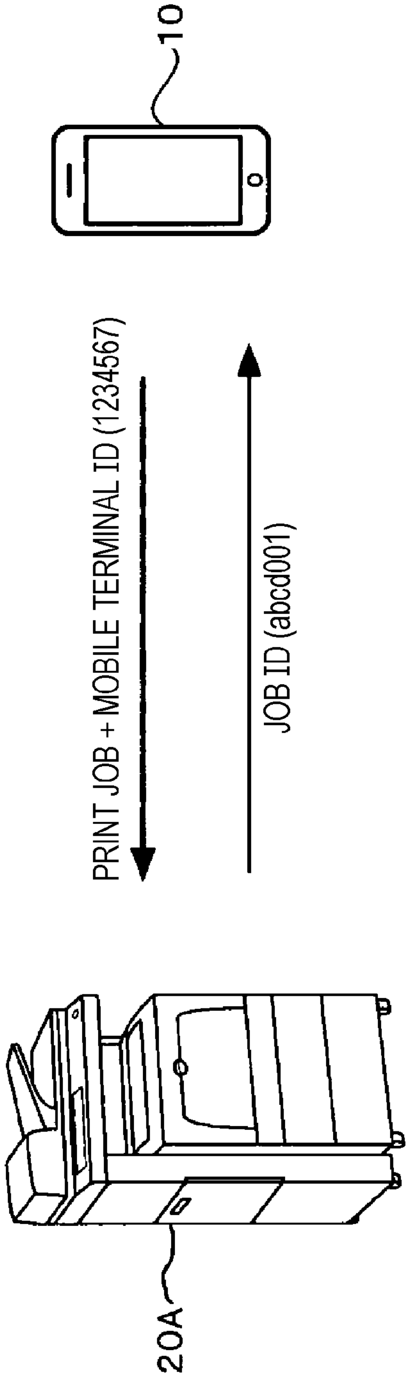
FIG. 8 illustrates how a job identification (ID) identifying a print job is created and transmitted to the mobile terminal apparatus when the mobile terminal apparatus transmits the print job and a mobile terminal ID to the image forming apparatus.

Referring to FIG. 8, when the mobile terminal apparatus 10 transmits the print job and the mobile terminal ID to the image forming apparatus 20A, the image forming apparatus 20A creates the job ID identifying the print job and transmits the job ID to the mobile terminal apparatus 10. The mobile terminal apparatus 10 stores, in an associated form, the received job ID and information related to a document name and date and time of transmission on the data memory 36.

In step S104, the image forming apparatus 20A stores the mobile terminal ID, job ID, and print data in an associated form. FIG. 9 illustrates an example of a print job management table that stores these pieces of information on the data memory 47 of the image forming apparatus 20A.

The print job management table in FIG. 9 indicates that the job ID, mobile terminal ID, and print data are stored in an associated form. Specifically, the job ID "abcd011," mobile terminal ID "1234567," and print data are stored in an associated form.

A print job transmitted to the image forming apparatus 20A by a user who is not present closer to the image forming apparatus 20A is accumulated on the image forming apparatus 20A.

Figure 10:
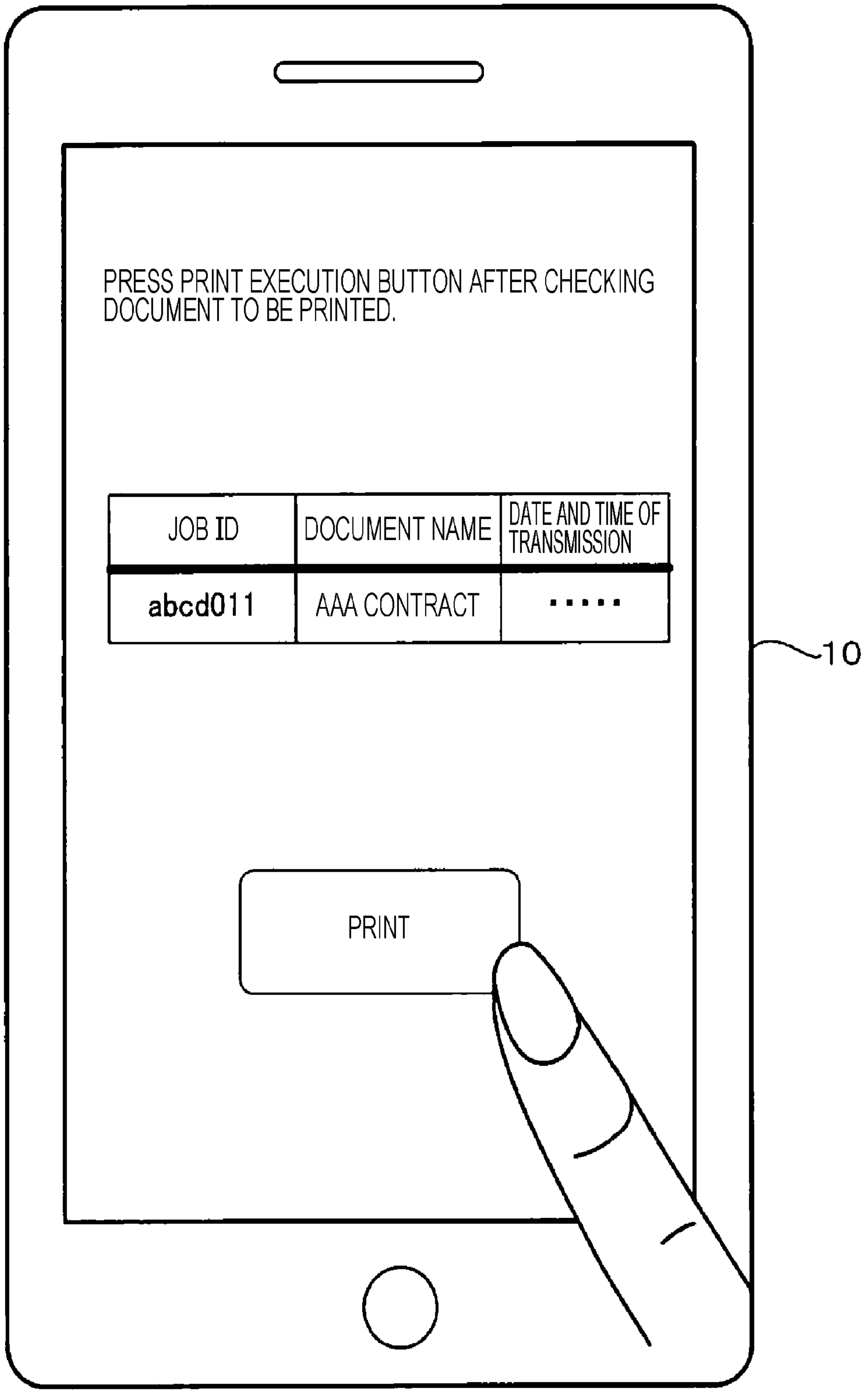
FIG. 10 illustrates a display screen example that is displayed in accordance with an application program in the mobile terminal apparatus when the print operation is performed.

When the user having transmitted the print job to the image forming apparatus 20A moves closer to the image forming apparatus 20A to perform the print operation of the print job, an application program in the mobile terminal apparatus 10 displays a display screen illustrated in FIG. 10.

The display screen in FIG. 10 displays not only information on the job ID, document name for the print job transmitted from the mobile terminal apparatus 10 to the image forming apparatus 20A but also a print execution button. When the user presses the print execution button after checking the print job to perform the print operation, the photographing unit 35 in the mobile terminal apparatus 10 is started up.

Figure 11:
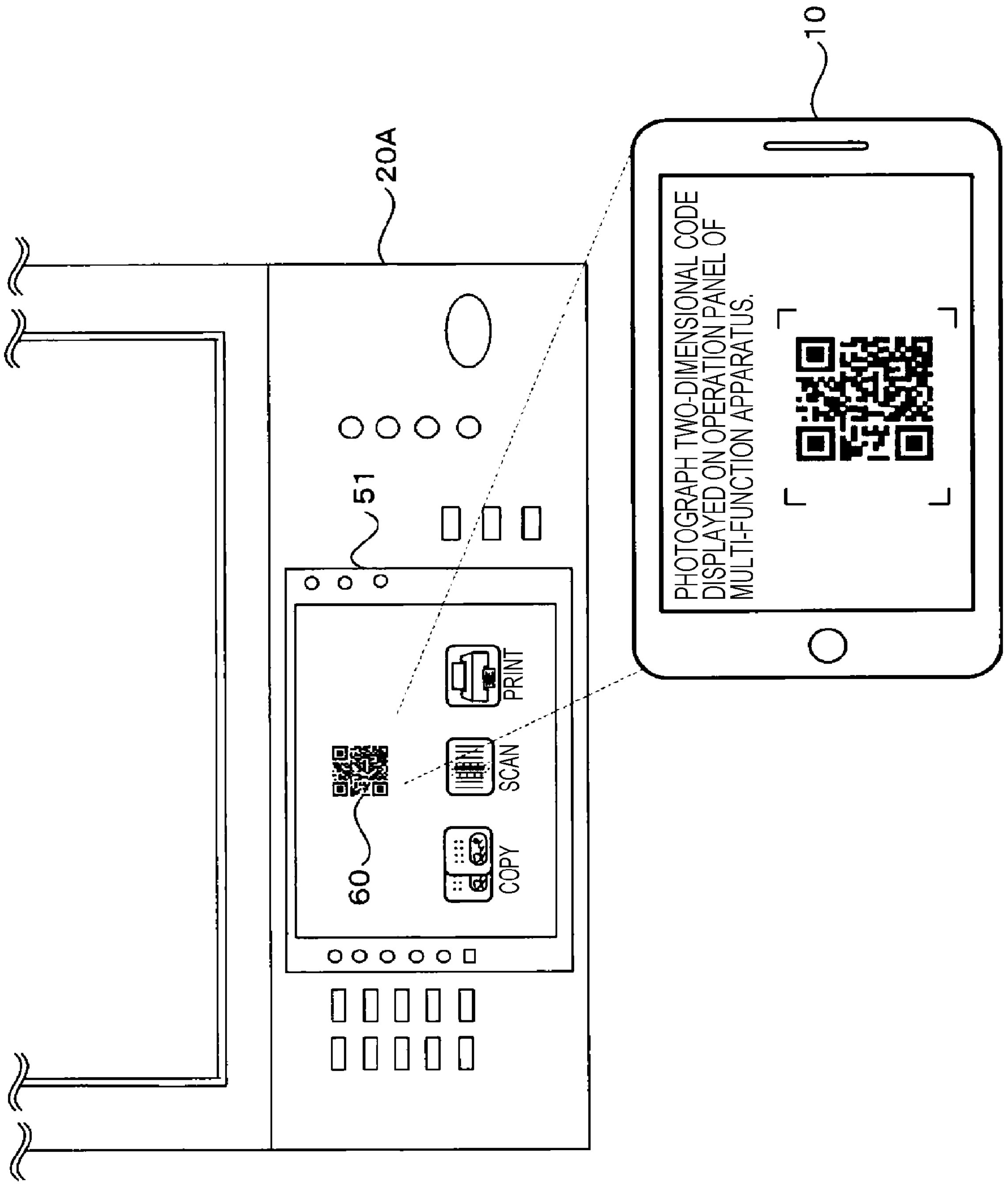
FIG. 11 illustrates how a two-dimensional code image that is displayed on the operation panel of the image forming apparatus by the mobile terminal apparatus is photographed.

When the user brings the mobile terminal apparatus 10 closer to the operation panel 51 of the image forming apparatus 20A, the photographing unit 35 photographs, in step S105, the two-dimensional code image 60 displayed on the operation panel 51 of the image forming apparatus 20A. FIG. 11 illustrates how the two-dimensional code image 60 displayed on the operation panel 51 of the image forming apparatus 20A is photographed by the mobile terminal apparatus 10.

When the two-dimensional code image 60 is photographed by the mobile terminal apparatus 10, the controller 34 converts the photographed two-dimensional code into the URL information in step S106. Decoding the two-dimensional code image 60 may now result in the URL information "https://xxx.yy/zzz/."

In step S107, the controller 34 in the mobile terminal apparatus 10 attaches the job ID and the mobile terminal ID to the acquired URL information and then transmits the resulting URL information to the image forming apparatus 20A.

Figure 12:
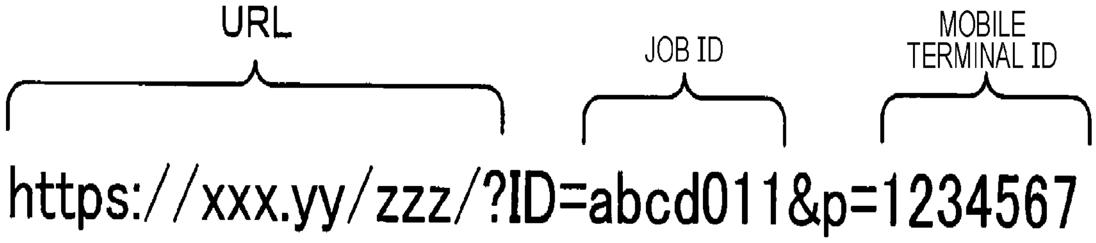
FIG. 12 illustrates detailed information that is transmitted from the mobile terminal apparatus to the image forming apparatus.

FIG. 12 illustrates detailed information that is transmitted in a manner described above from the mobile terminal apparatus 10 to the image forming apparatus 20A. Referring to FIG. 12, the mobile terminal apparatus 10 attaches the job ID "abcd011" and the mobile terminal ID "1234567" to the URL information "https://xxx.yy/zzz/" and then transmits the URL information "https://xxx.yy/zzz/" with the job ID "abcd011" and the mobile terminal ID "1234567" attached thereto to the image forming apparatus 20A. Specifically, the controller 34 in the mobile terminal apparatus 10 attaches to the URL information by specifying the job ID and mobile terminal ID by arguments. The controller 34 may transmit to the image forming apparatus 20A the job ID and mobile terminal ID as a power-on self-test (POST) message.

The image forming apparatus 20A having received the print instruction from the mobile terminal apparatus 10 determines whether the received URL information indicates the image forming apparatus 20A and that the job ID and mobile terminal ID are registered in the print job management table stored on the data memory 47. If the received URL information indicates the image forming apparatus 20A and the job ID and mobile terminal ID are stored on the data memory 47, the image forming apparatus 20A performs the print operation on the print data associated with the job ID and mobile terminal ID in step S108.

In step S109, the image forming apparatus 20A notifies the mobile terminal apparatus 10 of print results. If the print operation has been successfully completed, the image forming apparatus 20A notifies the mobile terminal apparatus 10 that the print operation has been successfully completed. If the print data associated with the job ID and mobile terminal ID is not stored, the image forming apparatus 20A does not perform the print operation and notifies the mobile terminal apparatus 10 of an error notification.

Figure 13:
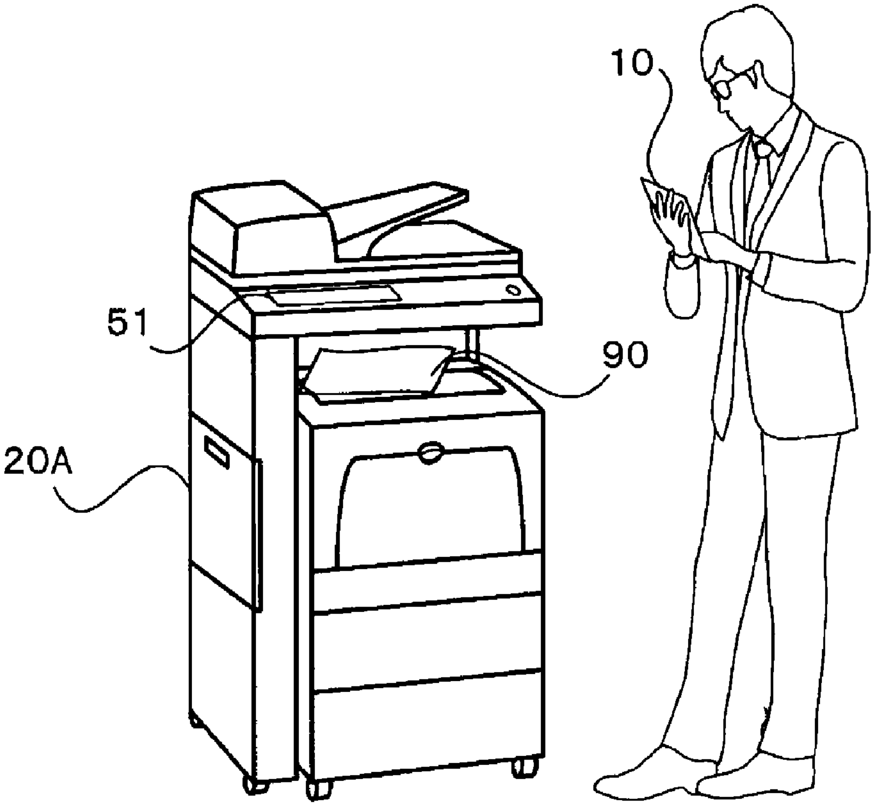
FIG. 13 illustrates how the print operation is performed when a user operates the mobile terminal apparatus at a location where the user is able to receive print results from the image forming apparatus.

When the process described above is thus performed, the print operation is performed in the state in which the user having moved closer to the image forming apparatus 20A is present at the location where the user is able to receive print results from the image forming apparatus 20A. FIG. 13 illustrates how the print operation is performed when the user operates the mobile terminal apparatus 10 at the location where the user is able to receive print results 90 from the image forming apparatus 20A.

If a single mobile terminal apparatus 10 transmits multiple print jobs to the image forming apparatus 20, the controller 34 stores multiple job IDs received from the image forming apparatus 20 on the data memory 36. In this case, the controller 34 stores, in an associated form, the print jobs, and information on document names and date and time of transmission identifiable by the user on the data memory 36. The controller 34 causes the user to select a job ID corresponding to print data that is to undergo the print operation from among multiple job IDs corresponding to the print jobs. The controller 34 transmits the print instruction to the image forming apparatus 20 in response to the selected job ID.

Specifically, the controller 34 displays multiple job IDs in a list, lets the user check a job ID from the list of the job IDs to select the job ID, and performs the print operation responsive to the selected job ID. The controller 34 may produce a shortcut icon for each job ID and performs the print operation indicated by the job ID corresponding to a shortcut icon tapped by the user from among the shortcut icons.

In the exemplary embodiment described above, the image forming apparatus having transmitted the print job is the same as the image forming apparatus performing the print operation. The disclosure is not limited to this configuration. The exemplary embodiment is equally applicable if the image forming apparatus having transmitted the print job is not the image forming apparatus performing the print operation.

The operation in such a case is described below with reference to FIG. 14.

Figure 14:
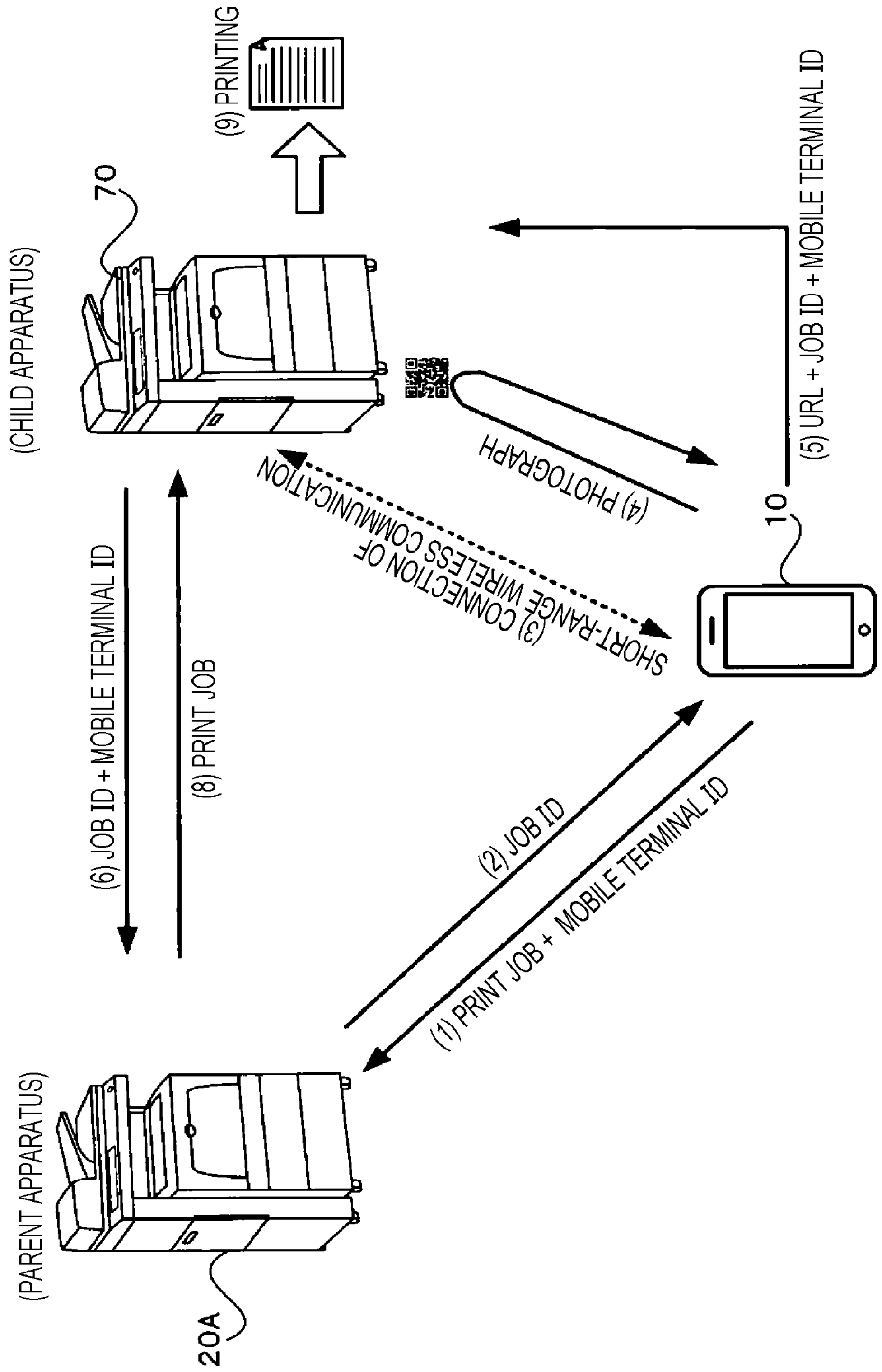
FIG. 14 illustrates an operation that is performed when an image forming apparatus having transmitted the print job is different from an image forming apparatus performing the print operation.

Referring to FIG. 14, the image forming apparatus 20A is a parent apparatus and the image forming apparatus 70 is a child apparatus. The image forming apparatus 20A serving as the parent apparatus is connected to the image forming apparatus 70 as the child apparatus via a network.

The user may transmit the print job from the mobile terminal apparatus 10 to the image forming apparatus 20A, and the image forming apparatus 70 performs the print operation as described below.

(1) In the initial state, the mobile terminal apparatus 10 is connected to the image forming apparatus 20A via the short-range wireless communication. The mobile terminal apparatus 10 transmits the print job and mobile terminal ID to the image forming apparatus 20A.

(2) The image forming apparatus 20A generates the job ID uniquely identifying the received print job and transmits the job ID to the mobile terminal apparatus 10.

(3) The mobile terminal apparatus 10 switches to the image forming apparatus 70 to establish the short-range wireless communication with the image forming apparatus 70.

(4) The user carrying the mobile terminal apparatus 10 moves closer to the image forming apparatus 70 and photographs the two-dimensional code displayed on the operation panel of the image forming apparatus 70.

(5) The mobile terminal apparatus 10 attaches, to the URL information obtained by decoding the photographed two-dimensional code, the job ID identifying the print job that is to be printed and the mobile terminal ID of the mobile terminal apparatus 10, and then transmits the URL information with the job ID and mobile terminal ID attached thereto to the image forming apparatus 70.

(6) Since the print job associated with the received job DI and the mobile terminal ID is not stored on the image forming apparatus 70, the image forming apparatus 70 transmits the job ID and mobile terminal ID to the image forming apparatus 20A serving as the parent apparatus.

(7) The image forming apparatus 20A references the print job management table on the image forming apparatus 20A to determine whether the image forming apparatus 20A has a print job associated with the job ID and mobile terminal ID received from the image forming apparatus 70.

(8) Since the print job management table on the image forming apparatus 20A includes the print job associated with the job ID and mobile terminal ID, the image forming apparatus 20A transmits the print job to the image forming apparatus 70.

(9) The image forming apparatus 70 performs the print operation in response to the print job transmitted from the image forming apparatus 20A.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiments above, and may be changed.

Modifications

According to the exemplary embodiment, the image forming apparatus is caused to perform the print operation. The disclosure is not limited to this method. The disclosure may also be applied to the case in which the output operation is performed by transmitting the output data to the image forming apparatus that may output an image.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A program causing a computer to execute a process, the process including:

transmitting output data to an image forming apparatus;

receiving, from the image forming apparatus serving as a destination of the output data, first identification information identifying the output data;

photographing a code image identifying the image forming apparatus that performs an output operation;

acquiring, from the photographed code image, second identification information identifying the image forming apparatus that performs the output operation; and transmitting, with the first identification information attached to the second identification information, an instruction to perform the output operation to the image forming apparatus that is identified in accordance with the second identification information.

(((2)))

In the program according to (((1))), transmitting the output data to the image forming apparatus incudes transmitting, to the image forming apparatus, the output data together with third identification information that identifies a mobile terminal apparatus that transmits the output data; and transmitting the instruction to perform the output operation to the image forming apparatus that is identified in accordance with the second identification information includes transmitting the first identification information, the second identification information and the third identification information with the first identification information and the third identification information attached to the second identification information.

(((3)))

In the program according to (((1))), the process further includes selecting, when a plurality of pieces of the output data are transmitted to the image forming apparatus, a piece of the first identification information corresponding to the output data used to perform the output operation, out of a plurality of pieces of the first identification information, and transmitting the instruction to perform the output operation to the image forming apparatus that is identified in accordance with the second identification information includes transmitting the second identification information and the first identification information that is selected in accordance with and attached to the second identification information.

(((4)))

In the program according to one of (((1))) through (((3))), the code image is a two-dimensional code image into which information identifying the image forming apparatus is encoded, and the second identification information is acquired by decoding the two-dimensional code image.

(((5)))

An image forming system including:

a mobile terminal apparatus that includes a first processor configured to: transmit output data to an image forming apparatus, receives, from the image forming apparatus serving as a destination of the output data, first identification information identifying the output data; photograph a code image identifying the image forming apparatus that performs an output operation; acquire, from the photographed code image, second identification information identifying the image forming apparatus that performs the output operation; and transmit, with the first identification information attached to the second identification information, an instruction to perform the output operation to the image forming apparatus that is identified in accordance with the second identification information; and the image forming apparatus that includes a second processor configured to: generate the first identification information and transmit the first identification information to the mobile terminal apparatus in response to receiving the output data from the mobile terminal apparatus; store the received output data and the first identification information in an associated form; display the code image into which the second identification information identifying the image forming apparatus is encoded; and when the second identification information having the attached first identification information is received from the mobile terminal apparatus, perform the output operation to output the output data if the second identification information is information identifying the image forming apparatus and the output data corresponding to the first identification information is stored.

(((6)))

In the image forming system according to (((5))), the first processor is configured to:

when the output data is transmitted to the image forming apparatus, transmit to the image forming apparatus the output data together with third identification information that identifies the mobile terminal apparatus that transmits the output data; and when the instruction to perform the output operation is transmitted to the image forming apparatus that is identified in accordance with the second identification information, transmit the first identification information, the second identification information and the third identification information with the first identification information and the third identification information attached to the second identification information.

(((7)))

In the image forming system according to (((6))), the second processor is configured to:

store in an associated form the output data, the first identification information, and the third identification information, received from the mobile terminal apparatus; and when the second identification information having the first identification information and the third identification information attached to the second identification information is received from the mobile terminal apparatus, perform the output operation on the output data if the second identification information is information identifying the image forming apparatus and the output data corresponding to the first identification information and the third identification information is stored.

(((8)))

In the image forming system according to (((5))), the second processor is configured to:

vary the code image if a predetermined condition is satisfied; and when the second identification information having the first identification information attached to the second identification information is received from the mobile terminal apparatus, perform the output operation on the output data if the second identification information is information corresponding to a code image currently being displayed.

(((9)))

In the image forming system according to (((8))), the image forming apparatus includes a human sensor used to detect a user present around, wherein the second processor is configured to vary the code image each time the human sensor detects approaching of the user.

(((10)))

In the image forming system according to (((8))), the second processor is configured to vary the code image each time the output operation is performed on the output data.

(((11)))

In the image forming system according to one of (((5))) through (((10))), the code image is a two-dimensional code image into which information identifying the image forming apparatus is encoded, and the second identification information is acquired by decoding the two-dimensional code image.

(((12)))

An image forming apparatus including a processor configured to:

in response to reception of output data from an external apparatus, generate first identification information identifying the output data and transmit the first identification information to the external apparatus;

store the received output data and the first identification information in an associated form;

if a predetermined condition is satisfied, vary and display a code image, into which second identification information identifying the image forming apparatus is encoded; and when the second identification information having the first identification information attached to the second information is received from the external apparatus, perform an output operation on the output data if the second identification information is information identifying the image forming apparatus and corresponds to the code image currently being displayed and the output data corresponding to the first identification information is stored.

(((13)))

The image forming apparatus according to (((12))), further including a human sensor used to detect a user present around, wherein the processor is configured to vary the code image each time the human sensor detects approaching of the user.

(((14)))

In the image forming apparatus according to (((12))), the processor is configured to vary the code image each time the output operation is performed on the output data.

What is claimed is:

1. A non-transitory computer readable medium storing a program causing a computer to execute a process, the process comprising:

transmitting output data to an image forming apparatus;

receiving, from the image forming apparatus serving as a destination of the output data, first identification information identifying the output data;

photographing a code image identifying the image forming apparatus that performs an output operation;

acquiring, from the photographed code image, second identification information in an address format identifying an address of the image forming apparatus that performs the output operation;

generating instruction data in the address format by attaching a first character string of the first identification information to an end of the second identification information acquired from the photographed code image and by attaching a second character string identifying an own device including the computer to an end of the first character string; and transmitting the generated instruction data in the address format to the image forming apparatus to perform the output operation to output the output data.

2. The non-transitory computer readable medium according to claim 1, wherein:

transmitting the output data to the image forming apparatus incudes transmitting, to the image forming apparatus, the output data together with third identification information that identifies a mobile terminal apparatus that transmits the output data; and the generated instruction data includes the third identification information.

3. The non-transitory computer readable medium according to claim 1, wherein:

the process further comprises selecting, when a plurality of pieces of the output data are transmitted to the image forming apparatus, a piece of the first identification information corresponding to the output data used to perform the output operation out of a plurality of pieces of the first identification information; and the generated instruction data includes the selected piece of the first identification information attached to the second identification information.

4. The non-transitory computer readable medium according to claim 1, wherein the code image is a two-dimensional code image into which information identifying the image forming apparatus is encoded, and wherein the second identification information is acquired by decoding the two-dimensional code image.

5. The non-transitory computer readable medium according to claim 1, wherein the address format is a URL format.

6. The non-transitory computer readable medium according to claim 1, wherein the generated instruction data is transmitted via a short-range wireless communication.

7. An image forming system comprising:

a mobile terminal apparatus that includes a first processor configured to:

transmit output data to an image forming apparatus;

receive, from the image forming apparatus serving as a destination of the output data, first identification information identifying the output data;

photograph a code image identifying the image forming apparatus that performs an output operation;

acquire, from the photographed code image, second identification information in an address format identifying an address of the image forming apparatus that performs the output operation;

generate instruction data in the address format by attaching a first character string of the first identification information to an end of the second identification information acquired from the photographed code image and by attaching a second character string identifying the mobile terminal to an end of the first character string; and transmit the generated instruction data in the address format to the image forming apparatus to perform the output operation to output the output data; and the image forming apparatus that includes a second processor configured to:

generate the first identification information and transmit the first identification information to the mobile terminal apparatus in response to receiving the output data from the mobile terminal apparatus;

store the received output data and the first identification information in an associated form;

display the code image into which the second identification information identifying the image forming apparatus is encoded; and when instruction data is received from the mobile terminal apparatus, perform the output operation to output the output data if the second identification information included in the instruction data is information identifying the image forming apparatus and the output data corresponding to the first identification information included in the instruction data is stored.

8. The image forming system according to claim 7, wherein the first processor is configured to:

when the output data is transmitted to the image forming apparatus, transmit to the image forming apparatus the output data together with third identification information that identifies the mobile terminal apparatus that transmits the output data, the third identification information including the second character string.

9. The image forming system according to claim 8, wherein the second processor is configured to:

store in an associated form the output data, the first identification information, and the third identification information, received from the mobile terminal apparatus; and when the instructions data with the second identification information having the first identification information and the third identification information attached to the second identification information is received from the mobile terminal apparatus, perform the output operation on the output data if the second identification information included in the instruction data is information identifying the image forming apparatus and the output data corresponding to the first identification information and the third identification information included in the instruction data is stored.

10. The image forming system according to claim 7, wherein the second processor is configured to:

vary the code image if a predetermined condition is satisfied; and when the instruction data with the second identification information having the first identification information attached to the second identification information is received from the mobile terminal apparatus, perform the output operation on the output data if the second identification information included in the instruction data is information corresponding to a code image currently being displayed.

11. The image forming system according to claim 10, wherein the image forming apparatus comprises a human sensor used to detect a user present around, and wherein the second processor is configured to vary the code image each time the human sensor detects approaching of the user.

12. The image forming system according to claim 10, wherein the second processor is configured to vary the code image each time the output operation is performed on the output data.

13. The image forming system according to claim 7, wherein the code image is a two-dimensional code image into which information identifying the image forming apparatus is encoded, and wherein the second identification information is acquired by decoding the two-dimensional code image.

14. An image forming apparatus comprising a processor configured to:

in response to reception of output data from an external apparatus, generate first identification information identifying the output data and transmit the first identification information to the external apparatus;

store the received output data and the first identification information in an associated form;

if a predetermined condition is satisfied, vary and display a code image, into which second identification information identifying the image forming apparatus is encoded; and when instruction data which is formed in an address format by attaching a first character string of the first identification information to an end of the second identification information and attaching a second character string identifying the external apparatus to an end of the first character string, is received from the external apparatus, perform an output operation on the output data if the second identification information included in the instruction data is information identifying the image forming apparatus and corresponds to the code image currently being displayed and the output data corresponding to the first identification information included in the instruction data is stored.

15. The image forming apparatus according to claim 14, further comprising a human sensor used to detect a user present around, wherein the processor is configured to vary the code image each time the human sensor detects approaching of the user.

16. The image forming apparatus according to claim 14, wherein the processor is configured to vary the code image each time the output operation is performed on the output data.

* * * * *